US007856645B2

(12) United States Patent
Pharn (10) Patent No.: US 7,856,645 B2
(45) Date of Patent: Dec. 21, 2010

(54) DISPLAYING PROGRAMMING AND NON-PROGRAMMING CONTENTS ON USER-DISPLAY SYSTEMS ACROSS COMPUTER NETWORKS

(75) Inventor: Art Pharn, Huntington Beach, CA (US)

(73) Assignee: ABROADCasting Company, Huntington Beach, CA (US)

( * ) Notice: Subject to any disclaimer, the term of this patent is extended or adjusted under 35 U.S.C. 154(b) by 814 days.

(21) Appl. No.: 11/217,232

(22) Filed: Sep. 1, 2005

(65) Prior Publication Data

US 2007/0050809 A1    Mar. 1, 2007

(51) Int. Cl.
*H04N 7/025* (2006.01)
*H04N 7/173* (2006.01)
*G06F 15/16* (2006.01)
*G06F 15/173* (2006.01)

(52) U.S. Cl. .................. 725/34; 725/100; 709/204; 709/231

(58) Field of Classification Search .............. 725/2, 725/32, 34, 35, 74, 78–82, 85, 115, 119, 725/105, 109, 110, 114, 116, 86–87, 91–93, 725/100; 709/230–233, 202–206
See application file for complete search history.

(56) References Cited

U.S. PATENT DOCUMENTS

| | | | | |
|---|---|---|---|---|
| 5,305,195 A * | 4/1994 | Murphy | ......................... | 705/1 |
| 5,774,170 A * | 6/1998 | Hite et al. | ...................... | 725/34 |
| 6,029,045 A * | 2/2000 | Picco et al. | ..................... | 725/34 |
| 6,571,392 B1 * | 5/2003 | Zigmond et al. | ............. | 725/110 |
| 6,698,020 B1 * | 2/2004 | Zigmond et al. | ............... | 725/34 |
| 6,704,930 B1 * | 3/2004 | Eldering et al. | ................ | 725/36 |
| 6,971,119 B1 * | 11/2005 | Arsenault et al. | ............. | 725/89 |
| 7,096,482 B2 * | 8/2006 | Fujita et al. | .................... | 725/32 |
| 7,146,627 B1 * | 12/2006 | Ismail et al. | ................... | 725/47 |
| 7,275,255 B2 * | 9/2007 | Suda et al. | ..................... | 725/80 |
| 7,313,804 B2 * | 12/2007 | Kurauchi et al. | .............. | 725/32 |
| 7,647,614 B2 * | 1/2010 | Krikorian et al. | ............. | 725/94 |
| 2001/0049745 A1 * | 12/2001 | Schoeffler | .................... | 709/238 |
| 2002/0100043 A1 * | 7/2002 | Lowthert et al. | .............. | 725/36 |
| 2002/0104083 A1 * | 8/2002 | Hendricks et al. | ............. | 725/34 |
| 2002/0184091 A1 * | 12/2002 | Pudar | .......................... | 705/14 |
| 2003/0237097 A1 * | 12/2003 | Marshall et al. | ............. | 725/105 |
| 2004/0083484 A1 * | 4/2004 | Annon Ryal | .................... | 725/1 |
| 2004/0172650 A1 * | 9/2004 | Hawkins et al. | ............... | 725/46 |
| 2005/0081252 A1 * | 4/2005 | Chefalas et al. | ............. | 725/135 |
| 2005/0193410 A1 * | 9/2005 | Eldering | ....................... | 725/34 |
| 2009/0070806 A1 * | 3/2009 | Flickinger | ..................... | 725/34 |

* cited by examiner

*Primary Examiner*—Andrew Y Koenig
*Assistant Examiner*—Jason Thomas
(74) *Attorney, Agent, or Firm*—Blakely, Sokoloff, Taylor & Zafman LLP (57) ABSTRACT

According to one embodiment, a system and method for displaying on a user-display system a program comprising a programming content including a plurality of programming content segments and a non-programming content including at least one non-programming content segment. The method includes receiving in the user-display system a first programming content segment of the programming content transmitted from a first source across a computer network, identifying at least one non-programming content segment associated with the first programming content, the identified non-programming content segment received in the user-display system from a second source across the computer network, and displaying the identified non-programming content segment by the user-display system.

18 Claims, 7 Drawing Sheets

DISPLAYING PROGRAMMING AND NON-PROGRAMMING CONTENTS ON USER-DISPLAY SYSTEMS ACROSS COMPUTER NETWORKS

FIELD

Embodiments of the invention relate to displaying of programs on a user-display system. More particularly, one embodiment of the invention is directed to displaying online programs transmitted across a computer network, such as the Internet.

GENERAL BACKGROUND

Commercial advertising content, such as television or online advertising is in wide-spread use today. Many advertisers utilize the wide-reach that the television or the Internet medium offers to maximize the number of people to which an advertisement can be displayed. While widely used, the existing advertising methods and formats are not without shortcomings.

In television broadcasting, commercial advertising contents such as commercials are broadcast along with programming content in the same data stream, and to all viewers. While television offers an effective means for reaching a broad audience, it is also a rather inefficient form of advertising. A shortcoming associated with television advertising is the unfeasibility to customize the commercials to be viewed only by the intended target audience so to maximize their sales potential. Such approach requires a separate broadcasting station for each broadcast to each user, and therefore, is unfeasible to implement. Thus, currently all viewers receive the same commercials whether they are the intended target audience of the commercial or not, resulting in inefficient use of the broadcasting time and added cost incurred to the commercial provider entity. Efforts to customize the commercials to a group of viewers, such as local viewer of a national broadcast, have been implemented through the added cost of utilizing additional local stations to broadcast localized commercials. But this approach mandates the overhead of utilizing additional stations while remaining generally inefficient since the group of viewers is selected based on geographic proximity to a local station, rather than personal profiles of each member in the group. Thus many of the viewers in a group audience may still not be the intended target audience of the commercial.

Another rapidly growing medium for advertising is the online advertising across the Internet. Unlike most television advertising, online advertising offers the ability to create customized advertising for each individual user based on a generated user-profile of the user. But existing methods to display the customized advertising to a target user are not without shortcomings as well. One wide-spread method is by use of advertising banners positioned around the window displaying main programming to the user. This approach is limited in effectiveness as users generally tend to ignore these fringing banners and focus on the central window displaying the main programming. Another wide-spread method is by use of advertising windows, popularly known as pop-ups, that typically cover all or large portions of the main programming window, thus forcing the user to view the advertising content therein. This approach is also limited in effectiveness as most users find the sudden intrusion of a pop-up as disruptive, intrusive and generally annoying. Many users therefore utilize software that prevents or limits the pop-ups from appearing on their display screen, thus reducing their advertising effectiveness. In addition, downloading the often large main programming online strains the often limited bandwidth available to a user, thus reducing available bandwidth for a commercial provider entity to effectively display commercial advertising content to a user. Efforts to do so often cause overall detrimental delays in downloading of both the main programming and the commercial advertising content, even forcing the commercial provider entity to transmit commercials at lower resolutions to reduce theirs size, which in turn reduces their advertising effectiveness.

Accordingly, what is needed is a cost-effective online advertisement method that offers the effectiveness of television advertising format while also reduces the overall bandwidth associated with online transmitting in television advertising format.

DETAILED DESCRIPTION

Figure 1:
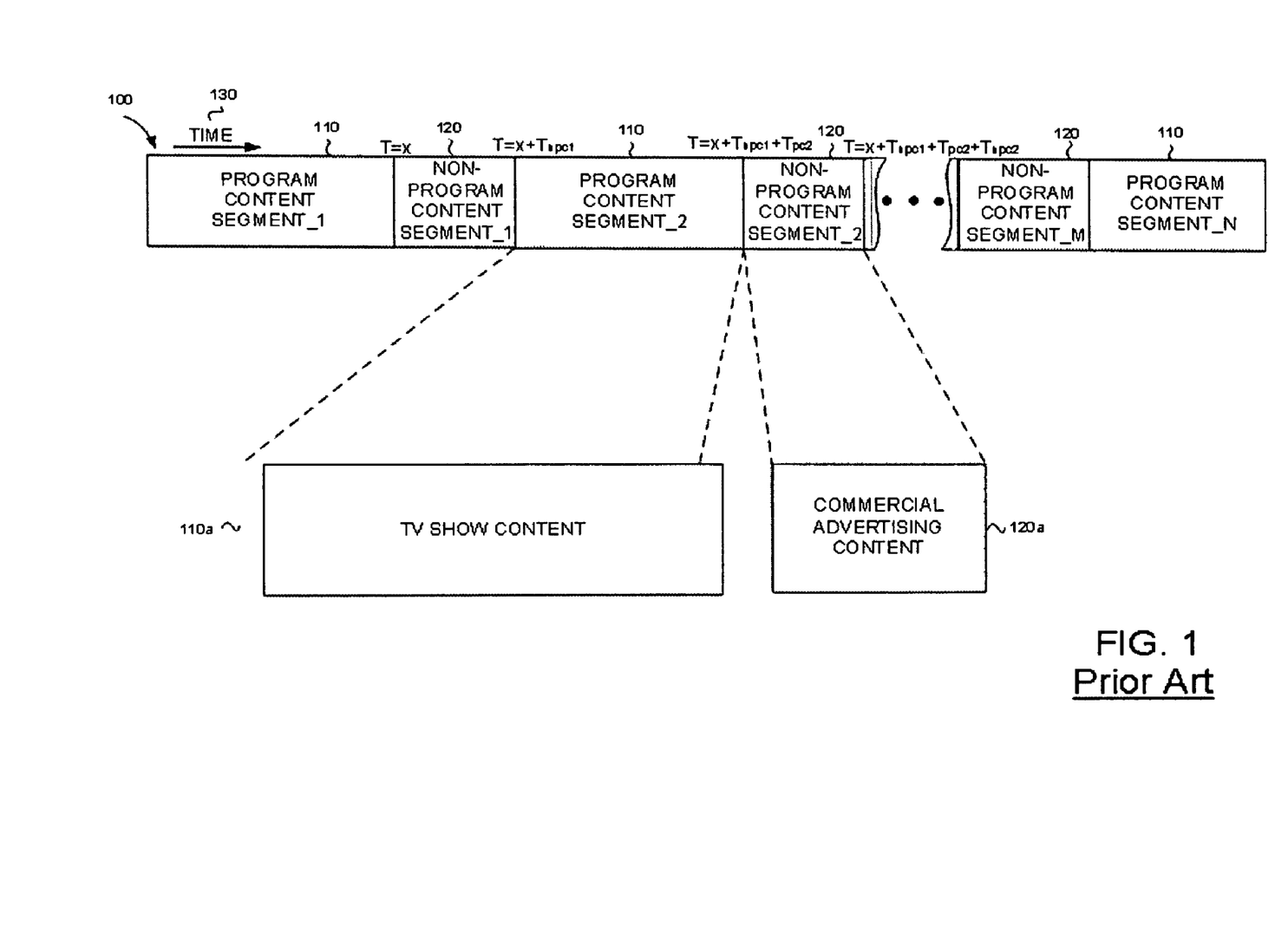
FIG. 1 illustrates a prior art television advertising format.

With reference to FIG. 1, a prior art television advertising format is illustrated for displaying a program 100. The program 100 generally includes programming content, such as the main TV show, and non-programming content such as commercial advertising content. The programming content comprises programming content segments 110, such as program content segment_1 through program content segment_N as shown in FIG. 1, with each segment 110 including a portion of the TV show content such as shown by the exemplary segment 110a. The non-programming content comprises one or more non-programming content segments 120, such as non-program content segment_1 through non-program content segment_M as shown in FIG. 1, with each segment 120 including one or more commercials such as shown by the exemplary segment 120a. As shown by the viewing timeline 130, the non-programming content segments 120 are generally displayed in between programming content segments 110, often at predetermined time offsets such as x and $x+T_{npc1}+T_{pc2}$ for illustrative purposes, and to a predetermined time, such as $(x+T_{npc1})$ and $(x+T_{npc1}+T_{pc2}+T_{npc2})$, respectively. "$T_{npc1}$" and "$T_{npc2}$" denote the duration (a prescribed duration of time) for playback of non-programming content segment_1 (npc1) and non-programming content segment_2 (npc2), respectively. "$T_{pc2}$" denotes the duration for playback of program content segment_2 (pc2). As described above, a shortcoming associated with television advertising is the unfeasibility to customize the non-programming content segments 120 to be viewed only by the intended target audience so to enhance their sales potential.

Figure 2A:
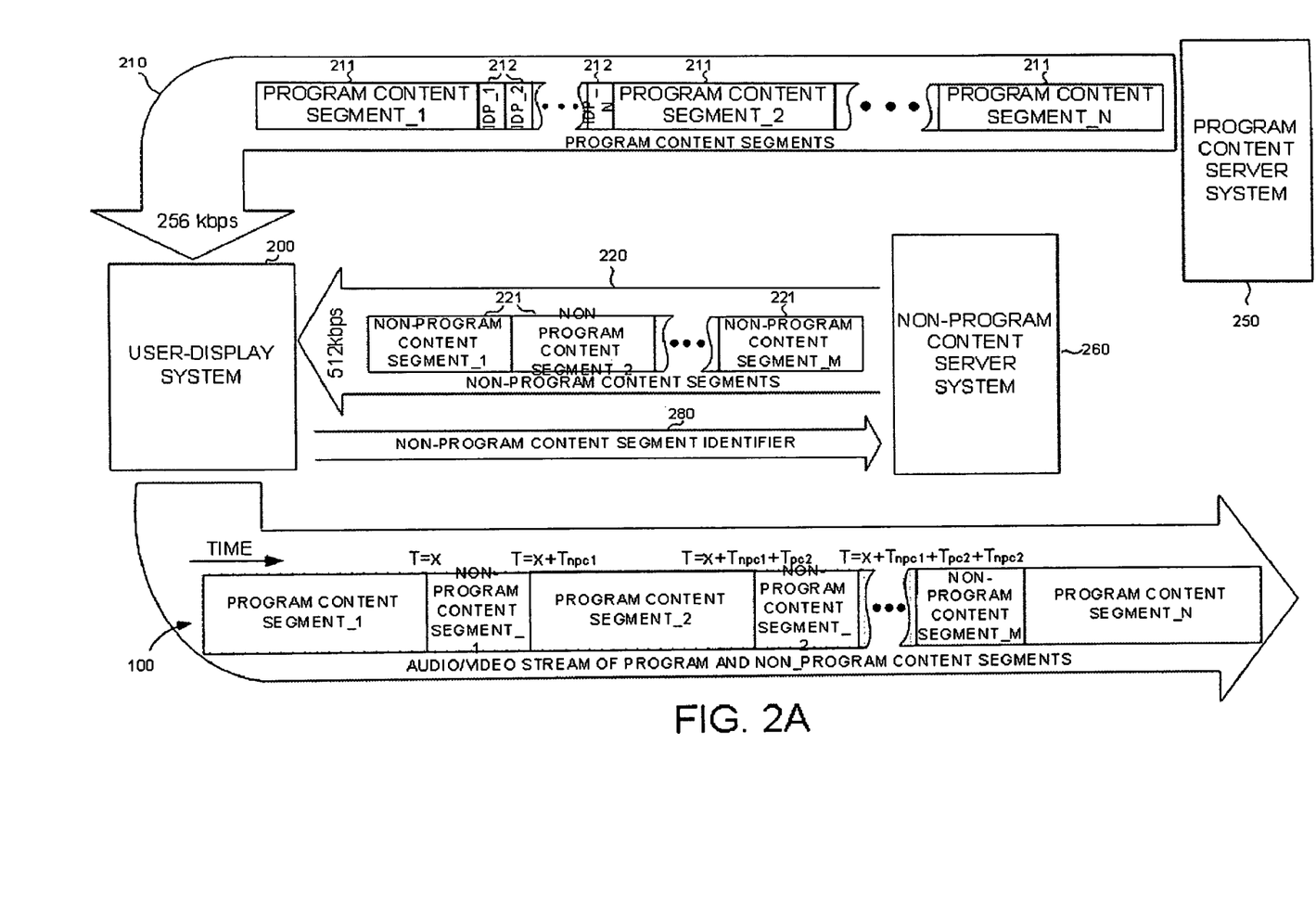
FIGS. 2A-B illustrate an exemplary system in which embodiments of the present invention may be practiced.

FIG. 2A illustrates an exemplary user-display system 200 in which embodiments of the present invention may be implemented. As shown in FIG. 2A, the user-display system 200 is adapted to receive programming content 210 comprising programming content segments 211, such as programming content segment_1 through program content segment_N, transmitted from a first source, such as a program content server system 250, across a computer network. Suitably, the programming content 210 is transmitted by the program content server system 250 across the Internet. As also shown in FIG. 2A, the user-display system 200 is further adapted to receive non-programming content 220 comprising non-programming content segments 221, such as non-program content segment_1 through non-program content segment_M, transmitted from a second source, such as a non-program content server system 260 across the computer network. Suitably, the non-programming content segments 221 are transmitted by the non-program content server system 260 across the Internet.

As described in greater detail in conjunction with FIG. 3A below, the user-display system 200 is adapted to display a program 100 which includes the received programming content 210, such as the main TV show, and non-programming content 220, such as commercial advertising content, in the above described television format, but with the non-programming content segments 220 customized to be viewed only by the intended target audience so to maximize their sales potential. Suitably, the user-display system 200 comprises a display subsystem (not shown) adapted to display the program 100 to a user, such as a computer monitor or a television screen adapted to receive and display programs transmitted across the Internet.

Figure 3A:
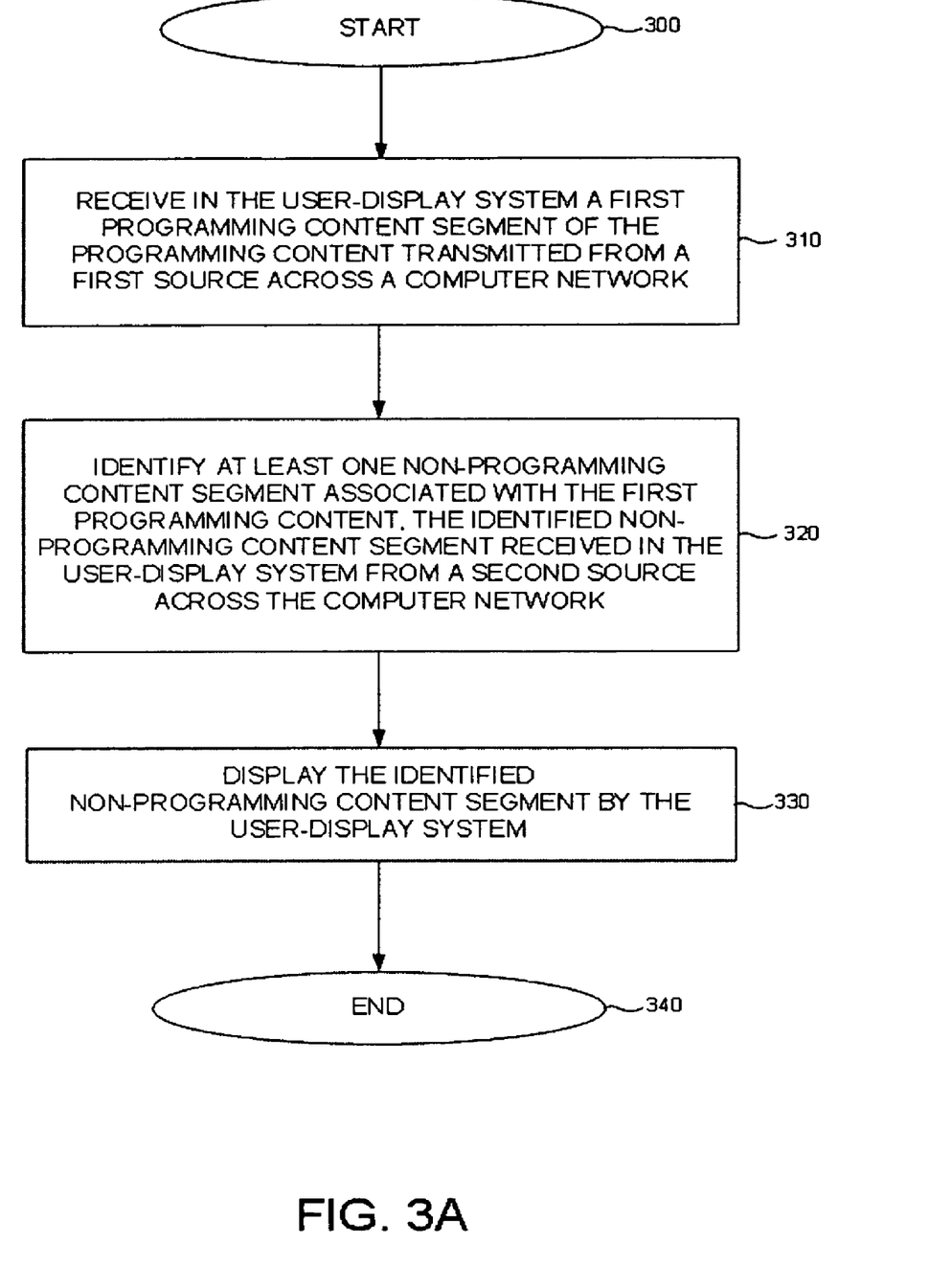
FIGS. 3A-B are flow charts illustrating exemplary process flows of the embodiments of the present invention.

FIG. 3A, in conjunction with FIG. 2A, describes an exemplary method of the present invention. As shown in FIG. 3A, the process begins at block 300 and proceeds to block 310 in which the user-display system 200 receives a programming content segment 211, such as program content segment_1, of the programming content 210 transmitted from the program content server system 250 across the Internet. Next, in block 320, at least one non-programming content segment 221, such as non-program content segment_1, associated with the received program content segment_1 is identified by the user-display system 200, as described below and in greater detail in conjunction with FIG. 3B. The identified non-program content segment_1 is received in the user-display system 200 from the non-program content server system 260 across the Internet. Next, in block 330, the user-display system 200 displays the received program content segment_1 and the identified non-program content segment_1. Suitably, each identified non-programming content segment 221 is displayed after the completion of displaying of the programming content segment 211 with which the identified non-programming content segment 221 is associated. The flow then proceeds to block 340 in which the overall operation ends.

Figure 2B:
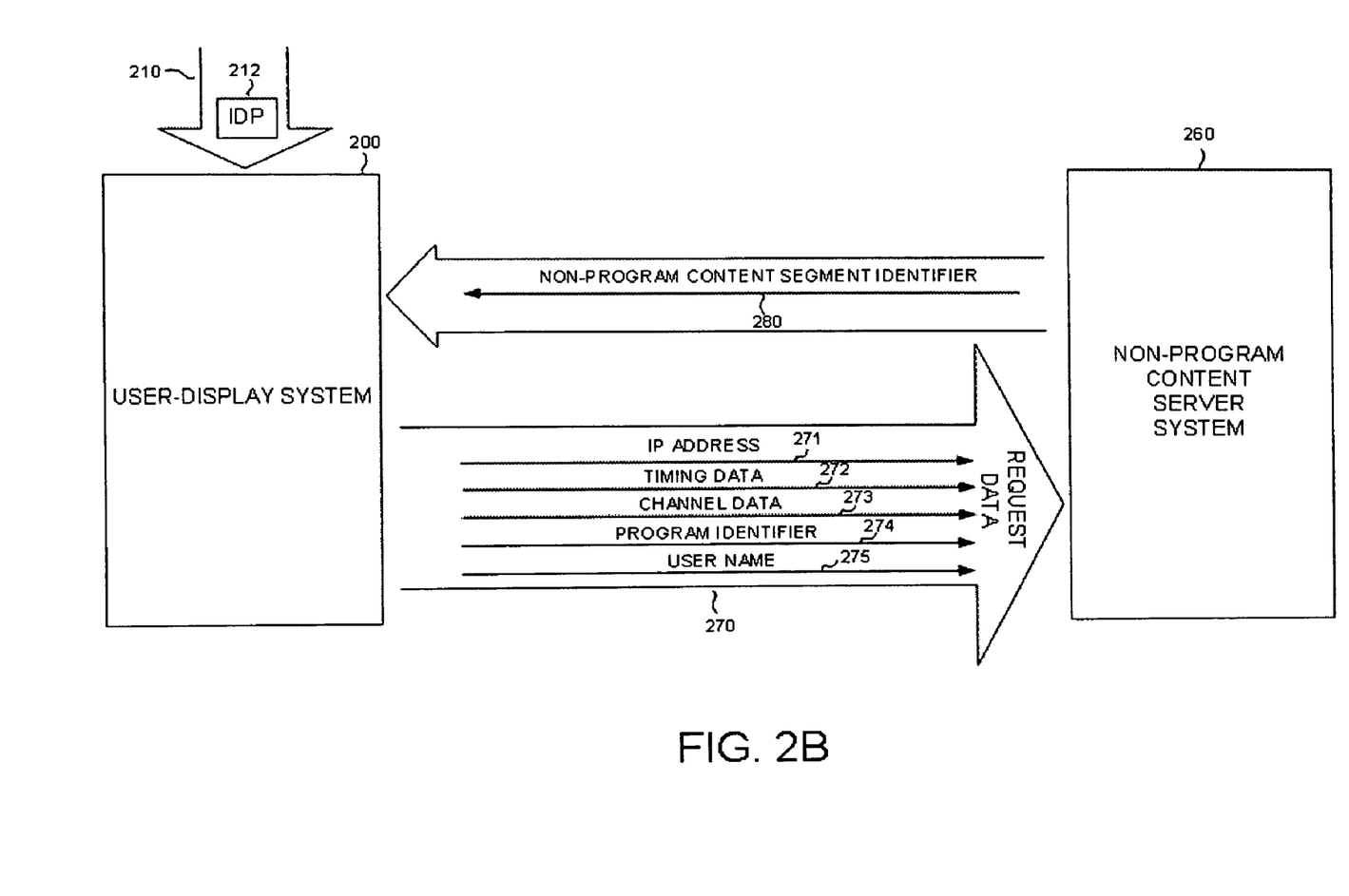
Figure 3B:
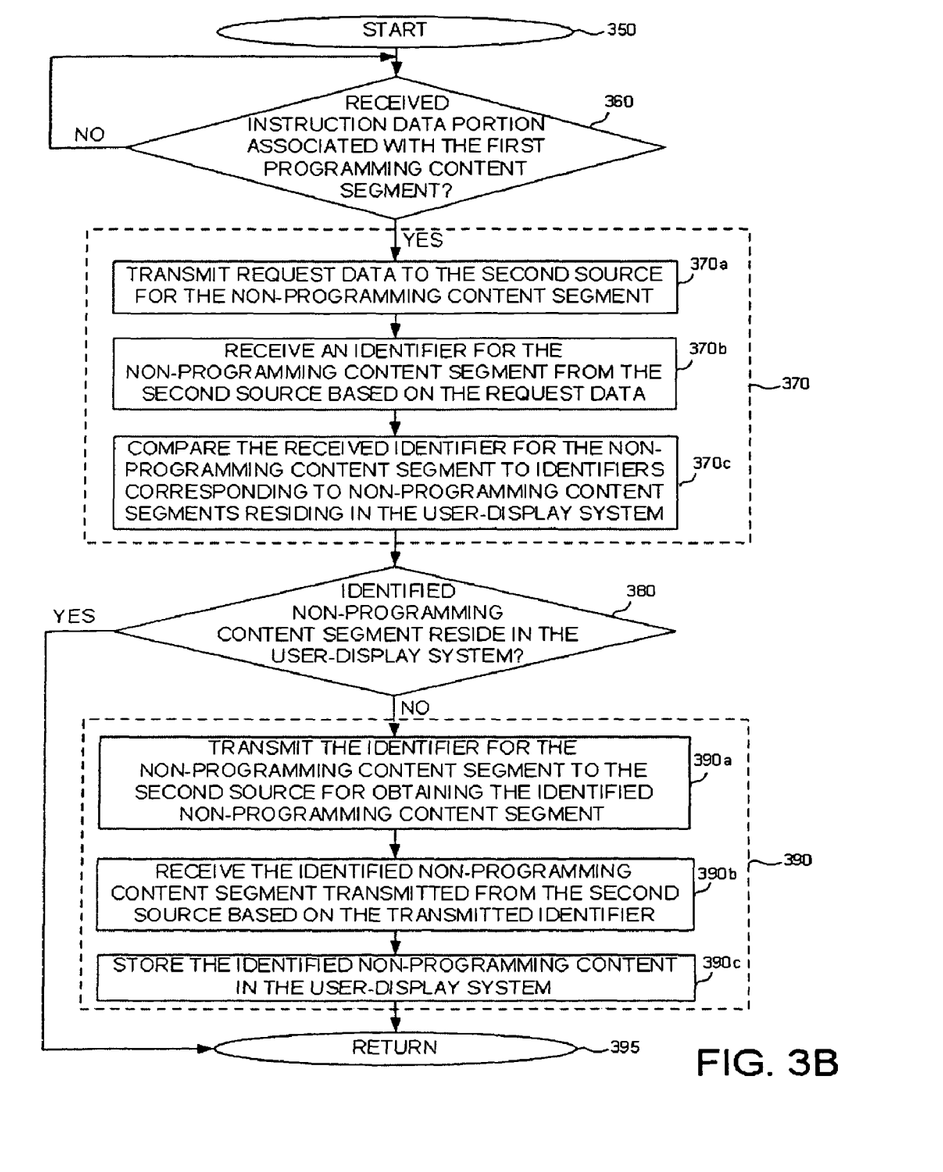

FIG. 3B in conjunction with FIG. 2B further illustrate the identifying process described in block 320 of FIG. 3A. As shown in FIG. 3B, the process begins at block 350 and proceeds to decision block 360 in which it is determined if at least one instruction data portion (IDP) 212 transmitted from the program content server system 250 is received in the user-display system 200. As shown in FIG. 2A, the programming content 210 comprises one or more instruction data portions 212 associated with one or more program content segments 211. Each of the instruction data portions 212 associated with a program content segment 211, such as IDP_1 through IDP_N associated with program content segment_1, comprises a timing data corresponding to a duration of a non-programming content segment 221 associated with a received programming content segment 211. For example, IDP_1 is associated with program content segment_1 and comprises a timing data as to the length of a yet to be determined non-programming content segment 221 to be displayed after the completion of the displaying of program content segment_1. The timing data of IDP_1 for example, may indicate that the length of the non-programming content segment 221 to be displayed is to be 30 seconds. Suitably, each instruction data portion 212 comprises a marker.

If it is determined that no instruction data portion 212 is received (block 360), the process repeats itself until an instruction data portion 212 is received. If it is determined that an instruction data portion 212 is received however, the flow proceeds to block 370 in which it is determined if an identified non-programming content segment has been previously stored within the user-display system 200. First, a request data 270 is transmitted from the user-display system 200 to the non-program content server system 260 (block 370a). The request data 270 comprises identifier data corresponding to the user-display system 200. As shown in FIG. 2B, the identifier data suitably comprises an internet protocol (IP) address 271 corresponding to the user-display system 200, the timing data 272 corresponding to the duration of the non-programming content segment associated with the first programming content as obtained from an IDP 212, broadcasting-channel data 273 corresponding to transmission channel of the program 100, program identifier data 274 identifying the transmitted program content 100, and at least one username 275 corresponding to at least one user associated with the user-display system 200.

Thereafter, the user-display system 200 receives an identifier 280 from the non-program content server system 260 for a non-programming content segment 221 that is selected by the non-program content server system 260 to be displayed with an associated program content segment 211 (block 370b). For example, the identifier 280 may identify non-program content segment_1 as the non-programming content segment 221 to be displayed following the completion of display of program content segment_1. The non-program content server system 260 selects the identified non-programming content segments 221 based on the identifier data and based on a user-profile of a user associated with the user-display system 200. For example, in a household of four users, each user can log-in using a the user's username 275. Then, based on the program identifier data 274 identifying the transmitted program content 100 as a sports game, the non-program content server system 260 can search for sports-related commercial advertising contents. The non-program content server system 260 can then utilize the user's profile corresponding to the received user name 275 and which includes user's physical location such as the user's city obtained from tracing the user's internet protocol (IP) address 271, to determine a user's favorite local sports and search for local commercial advertising contents for those sports. The non-program content server system 260 can then utilize the timing data 272 to narrow the search to commercial advertising contents whose length fit the commercial advertising content time slot length, such as 30 seconds, then use IP address 271 corresponding to the user-display system 200 to transmit the identifier 280 to the user-display system 200. One advantage of the foregoing feature of the present invention over the prior art is that by selecting non-programming content segments 221, such as commercial advertising content, based on a user-profile and physical location of a user, a commercial advertising content can be selected that is more in tune with the user's interests and user's location, thus resulting in a more efficient form of advertising. In addition, an entity providing the identified non-programming content segment can be billed based on a frequency of selection of the identified non-programming content segment and a predetermined billing rate corresponding to the identified non-programming content segment.

Next, the received identifier 280 for the identified non-programming content segment 221 is compared to identifiers corresponding to non-programming content segments 221 residing in the user-display system 200 to determine if the identified non-programming content segment 221 has been previously stored within the user-display system 200 (block 370*c*). Next, as shown in decision block 380, if it is determined that the identified non-programming content segment 221 does not reside in the user-display system 200, the flow then proceeds to block 390, in which the identified non-programming content segment 221 is fetched from the non-program content server system 260. Suitably, the fetching is commenced prior to the completion of displaying of a programming content segment 211 with which the identified non-programming content segment 221 is associated.

The fetching sequence of operations of block 390 are as follows. First, as shown in block 390*a*, the identifier 280 for the non-programming content segment 221 is transmitted by the user-display system 200 to the non-program content server system 260 for obtaining the identified non-programming content segment 221 based on the transmitted identifier 280, as shown in FIG. 2A. Next, the identified non-programming content segment 221, such as non-program segment_1 is transmitted from the non-program content server system 260 and received by the user-display system 200 (block 390*b*). Next, as shown in block 390*c*, the identified non-programming content 221 is stored in the user-display system 200. Suitably, the user-display system 200 comprises a data storage subsystem (not shown), such as a computer hard disk drive, adapted to receive and store the programming content 210 and non-programming contents 220 of the program 100.

Following the storage of the identified non-programming content 221 in the user-display system 200, or if in decision block 380, if was determined that the identified non-programming content segment 221 already reside in the user-display system 200, the flow then proceeds to block 395 for returning to block 320 of FIG. 3A, wherein in subsequent block 330, the identified non-programming content segment 221 is displayed in the manner described above. Suitably, the identified non-programming content 221 remains stored in the user-display system 200 for subsequent displays. One advantage of the foregoing feature of the present invention over the prior art is that once a non-programming content segments 221, such as commercial advertising content, is stored in the user-display system 200, it can be displayed from the user-display system 200 during subsequent displays. This reduces the need for utilizing the user's often limited available bandwidth to download commercial advertising content and other non-programming contents each time, therefore leaving more bandwidth available to a user for faster downloading of programming content 210, particularly those of higher resolution or longer duration.

Suitably, the non-programming content segments 221 may be of a higher resolution than the programming content segments 211 to enhance their advertising appeal. Suitably, the user-display system 200 is adapted to display the higher resolution identified non-programming content segments 221 received from the non-program content server system 260. To reduce delays associated with transmission of higher resolution non-programming content segments 221, the non-program content server system 260 is suitably adapted to transmit the identified non-programming content segment 221 at a substantially faster rate than the programming content segments 211 transmitted from the program content server system 250, such as at 512 kilobits per second (kbps) for non-programming content segments 221 compared to a 256 kbps rate for the programming content segments 211.

It should be noted that the foregoing operations of FIGS. 3A and 3B were described in the context of an exemplary programming content segment 211 and non-programming content segment 221 for simplicity of illustration only, and that the user-display system 200 is adapted to readily apply the foregoing operations of present invention to all programming content segments 211 and non-programming content segments 221 in displaying of a complete program 100.

Figure 4:
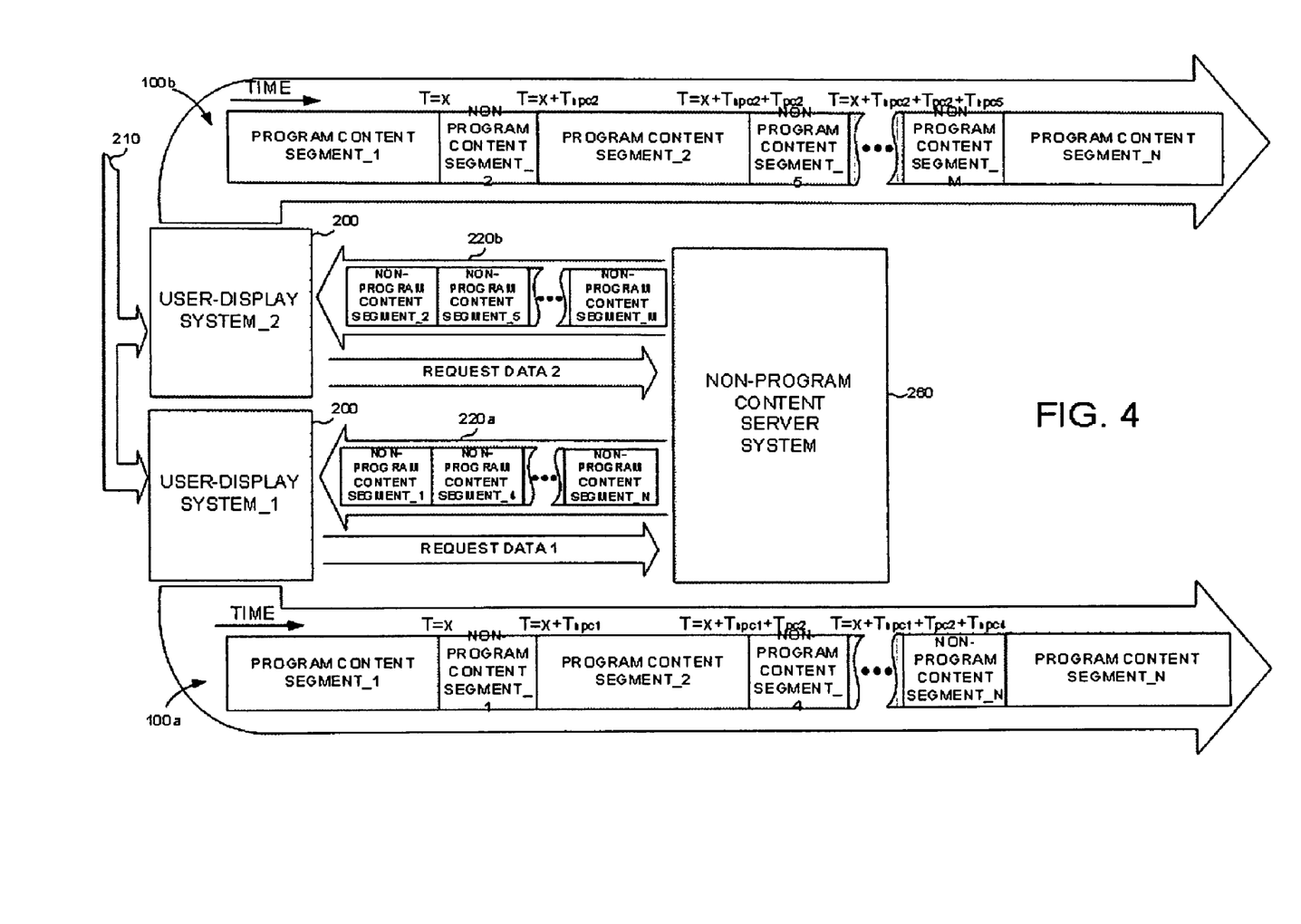
FIG. 4 illustrates another exemplary system in which embodiments of the present invention may be practiced.

FIG. 4 illustrates another exemplary configuration in which embodiments of the present invention may be practiced. As shown in FIG. 4, the programming content 210 is transmitted from the program content server system 250 to more than one user-display system 200, with each of the different user-display systems 200 corresponding to a different users. For simplicity of illustration, only two user-display systems 200, user-display system_1 and user-display system_2, are shown in FIG. 4 although the present invention is no way limited to just two user-display systems 200. As shown in FIG. 4, each of the user-display system_1 and user-display system_2 receive the same programming content 210 and are in communication with the same non-program content server system 260. In this embodiment of the present invention, the non-program content server system 260 may select different non-programming content segments for each of user-display system_1 and user-display system_2 based on predetermined differences in the user-profiles of the users of the user-display system_1 and user-display system_2.

In the exemplary illustration of FIG. 4, the non-program content server system 260 may select non-programming content segments 220*b* comprising of non-program content segment_2 and non-program content segment_5 (and others) for the user-display system_2, while selecting non-programming content segments 220*a* comprising of non-program content segment_1 and non-program content segment_4 (and others) for the user-display system_1. Each of the user-display system_1 and user-display system_2 then displays the received non-programming content segments along with the received programming content 210 in form of program 100*a*, and 100*b* respectively. In this manner, while both user-display system_1 and user-display system_2 are displaying the same programming content 210, such as the same movie, at the same time, they are displaying different non-programming content segments, such as different commercials, during the same commercials time slot, such as showing non-program content segment_1 between t=x and t=x+$T_{npc1}$ and non-program content segment_2 between t=x and t=x+$T_{npc2}$ for each of programs 100*a* and 100*b*, respectively, wherein $T_{npc1}$=$T_{npc2}$, as shown in FIG. 4.

One advantage of the foregoing feature for an embodiment of the present invention over the prior art is that by selecting different non-programming content segments based on different user-profile of each user, commercial advertising contents for each user can be selected that is more in tune with each user's interests, thus resulting in a more efficient form of advertising to each user. In addition, the one or more entities providing the differently selected non-programming content segment can be billed differently based on the number of users for which a different a non-programming content segment was selected, as well as the frequency of selection and predetermined billing rates corresponding to the differently selected non-programming content segments.

Figure 5:
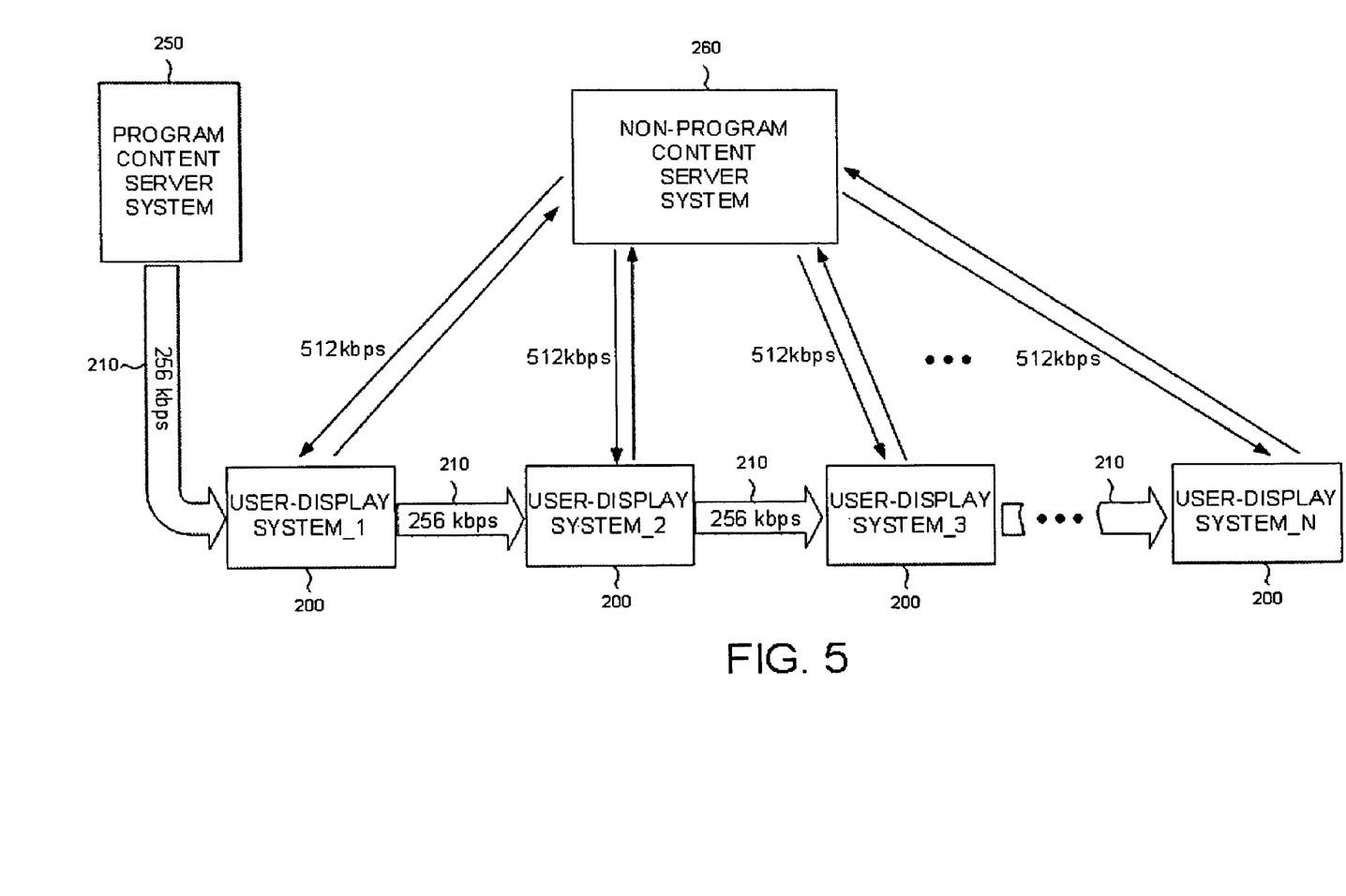
FIG. 5 illustrates yet another exemplary system in which embodiments of the present invention may be practiced.

FIG. 5 illustrates yet another exemplary configuration in which embodiments of the present invention may be practiced. As shown in FIG. 5, the programming content 210 is transmitted from the program content server system 250 to more than one user-display system 200, which are in peer-to-peer communication with each other (in a manner well know in the art) for transmitting of the programming content 210 between the user-display systems 200, such as at 256 kbps. In addition, each of the user-display system 200s is in communication with the non-program content server system 260 for receiving of non-programming content 220 in the manner described above, such as at 512 kbps. One advantage of the foregoing feature of the present invention over the prior art is that by storing each recurring non-programming content segment on user-display system 200 instead of transmitting it along with programming content segment for each displaying, the uploading bandwidth requirement (often the bottle neck in peer-to-peer communication) for user-display system 200 is reduced.

It should be noted that the various features of the foregoing embodiments were discussed separately for clarity of description only and they can be incorporated in whole or in part into a single embodiment of the invention having all or some of these features.

What is claimed is:

1. A method for displaying on a first and second user-display system a live Internet television programming content including a plurality of live Internet television programming content segments and a non programming content including at least one non-programming content segment being a displayable, audio-visual addressable advertisement at individual user-display system level where each individual user-display system has a different public internet protocol (public IP) address, the method comprising:

receiving in the first user-display system the live Internet television programming content including a first programming content segment and at least one instruction data portion transmitted from a first source across a public communication link being a public global computer network crossing at least one of metropolitan, regional, and national boundaries;

receiving in the first user-display system a first identifier corresponding to an identified first non-programming content segment from a second source, the first identifier being based on at least a first identifier data, the first identifier data comprising at least one of an internet protocol (IP) address corresponding to the first user-display system and at least one username identifying a current user of the first user-display system, the second source being different from the first source;

fetching the identified first non-programming content segment from the second source if the first identifier does not match any of the identifiers corresponding to a plurality of non-programming segments residing in the first user-display system, fetching the identified first non-programming content segment comprises transmitting the first identifier to the second source and receiving in the first user-display system the first non-programming content segment based on the first identifier from the second source;

displaying the first non-programming content segment by the first user-display system;

receiving in the second user-display system the live Internet television programming content transmitted from the first user-display system where the first user-display system is not allowed to forward the live Internet programming content being watched to more than the second user-display system and is currently displaying the same live Internet television programming content as the second user-display system;

receiving in the second user-display system a second identifier corresponding to an identified second non-programming content segment from the second source, the second identifier being based on at least a second identifier data, the second identifier data comprising at least one of an IP address corresponding to the second user-display system and at least one username identifying a current user of the second user-display system;

fetching the identified second non-programming content segment from the second source if the second identifier does not match any of the identifiers corresponding to a plurality of non-programming segments residing in the second user-display system, fetching the identified second non-programming content segment comprises transmitting the second identifier to the second source and receiving in the second user-display system the second non-programming content segment based on the second identifier from the second source, a transmission rate of the non-programming content segment from the second source being equal or greater than a transmission rate of the first programming content segment from the first user-display system; and displaying the second non-programming content segment by the second user-display system.

2. The method of claim 1, wherein the at least one instruction data portion including a timing data corresponding to a duration of a non-programming content segment associated with the first programming content segment.

3. The method of claim 1, wherein the identified non-programming content segment is displayed after a completion of displaying of the first programming content segment.

4. The method of claim 1, wherein the fetching is commenced prior to the completion of displaying of the first programming content segment.

5. The method of claim 1, further comprising:

sending a first request from the first user-display system to the second source, the first request including the first identifier data, the second source being different from the first source; and sending a second request from the second user-display system to the second source, the request including a second identifier data, the second identifier data being different from the first identifier.

6. The method of claim 1, further comprising:

comparing the first identifier to identifiers corresponding to a plurality of non-programming segments residing in the first user-display system to determine if the identified first non-programming content has been previously stored within the first user-display system; and comparing the second identifier to identifiers corresponding to a plurality of non-programming segments residing in the second user-display system to determine if the identified second non-programming content has been previously stored within the second user-display system.

7. The method of claim 1, wherein the first identifier data and the second identifier data further comprise at least one of a timing data corresponding to the duration of a non-programming content segment associated with the first programming content segment, a broadcasting-channel data corresponding to transmission channel of the program content, and a program identifier data identifying the programming content.

8. The method of claim 1, wherein fetching further comprises:

storing the first non-programming content segment in the first user-display system; and storing the second non-programming content segment in the second user-display system.

9. The method of claim 1, wherein the computer network comprises the Internet.

10. The method of claim 1, wherein the second source transmits the identified non-programming content segment at a substantially faster rate than the programming content segments transmitted from the first source.

11. The method of claim 1, wherein the non-programming content segments are of a higher resolution than the programming content segments.

12. The method of claim 1, wherein
the identified first non-programming content segment is selected by the second source based on a first user-profile of a user associated with the first user-display system, and
the identified second non-programming content segment is selected by the second source based on a second user-profile of a user associated with the second user-display system.

13. The method of claim 1, wherein the first source comprises a first server system and the second source comprises a second server system.

14. The method of claim 1, wherein the non-programming content comprises advertising content.

15. The method of claim 1, wherein the first and second user-display systems receives the identified first and second non-programming content segments, respectively, from the second source for displaying in between the plurality of programming content segments.

16. The method of claim 1, wherein the first and second user-display systems are in peer-to-peer communication with each other for transmitting of the programming content from the first user-display system to the second user-display system.

17. A method of claim 1, further comprising:
billing a first entity providing the identified first non-programming content segment based on a frequency of selection of the identified first non-programming content segment and a predetermined billing rate corresponding to the identified first non-programming content segment; and
billing a second entity providing the identified second non-programming content segment based on a frequency of selection of the identified second non-programming content segment and a second predetermined billing rate corresponding to the identified second non-programming content segment.

18. The method of claim 17, further comprising:
billing the first entity based on a number of user-display systems for which the identified first non-programming content segment was selected; and
billing the second entity based on a number of user-display systems for which the identified second non-programming content segment was selected.

* * * * *